United States Patent
Jones et al.

(10) Patent No.: US 8,102,469 B2
(45) Date of Patent: Jan. 24, 2012

(54) INTERLACING APPARATUS, DEINTERLACING APPARATUS, DISPLAY, IMAGE COMPRESSOR AND IMAGE DECOMPRESSOR

(75) Inventors: Graham R. Jones, Oxfordshire (GB); Lyndon Hill, Berkshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 1149 days.

(21) Appl. No.: 11/569,985

(22) PCT Filed: May 31, 2005

(86) PCT No.: PCT/JP2005/010439
§ 371 (c)(1),
(2), (4) Date: Sep. 28, 2007

(87) PCT Pub. No.: WO2005/120085
PCT Pub. Date: Dec. 15, 2005

(65) Prior Publication Data
US 2008/0165275 A1   Jul. 10, 2008

(30) Foreign Application Priority Data
Jun. 2, 2004   (GB) ................................. 0412206.5

(51) Int. Cl.
*H04N 7/01*   (2006.01)
*H04N 11/20*   (2006.01)
(52) U.S. Cl. ........................................ 348/448; 348/54
(58) Field of Classification Search .......... 348/441–458, 348/59, 54
See application file for complete search history.

(56) References Cited

U.S. PATENT DOCUMENTS

| | | | | |
|---|---|---|---|---|
| 5,808,599 A | * | 9/1998 | Allio | 345/6 |
| 6,278,480 B1 | * | 8/2001 | Kurahashi et al. | 348/59 |
| 2005/0105179 A1 | * | 5/2005 | Taira et al. | 359/463 |
| 2007/0183650 A1 | * | 8/2007 | Lipton et al. | 382/154 |

FOREIGN PATENT DOCUMENTS

| | | |
|---|---|---|
| EP | 1 501 317 | 1/2005 |
| EP | 1 501 318 | 1/2005 |
| JP | 2004-104368 | 4/2004 |
| WO | 02/076107 | 9/2002 |
| WO | 03/056843 | 7/2003 |
| WO | 03/092304 | 11/2003 |
| WO | 03/092305 | 11/2003 |
| WO | 2004/066203 | 8/2004 |

OTHER PUBLICATIONS

International Search Report for corresponding Application No. PCT/JP2005/010439 mailed Sep. 19, 2005.

* cited by examiner

*Primary Examiner* — Michael Lee
(74) *Attorney, Agent, or Firm* — Renner, Otto, Boisselle & Sklar, LLP

(57) ABSTRACT

An apparatus (24) is provided for interlacing a plurality of input images ($I_0$, $I_1$) to form an output image (O). The interlacing apparatus (24) comprises a programmable memory (20) for storing one or more interlacing configuration patterns ($P_1$, $P_2$ and $P_3$) which define a mapping from pixels of the input images ($I_0$, $I_1$) to pixels of the output image (O). The interlacing apparatus (24) also comprises a pixel data rearranger or interlacer (16) for rearranging pixel data in accordance with a pattern (P) stored in the memory (20). A pattern controller (18) is provided for selecting any one of the patterns ($P_1$, $P_2$ and $P_3$) for use in the interlacer (16). Such an interlacing apparatus (24) can be used to drive a display device such as a multiple view directional display device or an autostereoscopic display device. A deinterlacer, an image compressor and an image decompressor are also provided.

25 Claims, 18 Drawing Sheets

Output Image O (a)

One Cycle of Small Interlacing Patten P

Repeated Patten For Whole Image O (b)

One Cycle of Multiline Interlacing Patten P

Repeated Patten For Whole Image O

FIG.5

| i C x | L R x | R G x-1 | L B x | | R R x | L G x | R B x |
|---|---|---|---|---|---|---|---|
| y | y | y | y | | y | y | y |

FIG.6

Original Images

Image 0      Image 0 pixel-1 pixel 0 pixel 1     pixel-1 pixel 0 pixel 1

| R G B | R G B | R G B |
|---|---|---|
| A B C | D E F | G H I |

↑ Start of Block

| R G B | R G B | R G B |
|---|---|---|
| J K L | M N O | P Q R |

— Colour Component
     Subpixel Value —

Steps in interlacing
0R0/0 1G-1/0 0B0/0 1R0/0 0G0/0 1B0/0

0R0/0 = D

1. | R G B | R G B |
   | D |   |   |   |   |   |

1G-1/0 = K

2. | R G B | R G B |
   | D | K |   |   |   |   |

0B0/0 = F

3. | R G B | R G B |
   | D | K | F |   |   |   |

1R0/0 = M

4. | R G B | R G B |
   | D | K | F | M |   |   |

0G0/0 = E

5. | R G B | R G B |
   | D | K | F | M | E |   |

1B0/0 = O

6. | R G B | R G B |
   | D | K | F | M | E | O |

Final Interlaced Image O

| R G B | R G B |
|---|---|
| D K F | M E O |

Steps In Interlacing Patten

N O L9

| N = 0

R G B
1.

| O = 255

R G B
2.

| L9 = 9

R G B
3.

Original Images

Image 0    Image 1           Output Image pixel 0    pixel 0           pixel-1  pixel 0  pixel 1

R G B      R G B             R G B  R G B  R G B
A B C      D E F             G H I  J K L  M N O

Steps in interlacing pattern
0R0/0  G-1/0  S  1B0/0  0G0/0  S

| 0R0/0 = A
　　　　R G B R G B
　　1. |A| | | | | |

| G-1/0 = H
　　　　R G B R G B
　　2. |A|H| | | | |

| S = Skip
　　　　R G B R G B
　　3. |A|H|L| | | |

| 1B0/0 = F
　　　　R G B R G B
　　4. |A|H|L|F| | |

| 0G0/0 = B
　　　　R G B R G B
　　5. |A|H|L|F|B| |

| S = Skip
　　　　R G B R G B
　　6. |A|H|L|F|B|O|

Final Output Image    pixel 0  pixel 1

R G B  R G B
　　　　　　　　　　　A H L  F B O

INTERLACING APPARATUS, DEINTERLACING APPARATUS, DISPLAY, IMAGE COMPRESSOR AND IMAGE DECOMPRESSOR

TECHNICAL FIELD

The present invention relates to an apparatus for interlacing a plurality of input images to form an output image and to an apparatus for deinterlacing an input image to form a plurality of output images. The present invention also relates to a display including such apparatus and to an image compressor and an image decompressor.

BACKGROUND ART

"Field Interlacing" is a well-known technique in television technology and is used to increase the perceived flicker frequency and update rate of a display. In this technique, two "field" images of half the display vertical resolution are combined together to form one "frame". There is a 180° phase lag between consecutive fields so that one field image comprises odd lines of an original image and the other field image of each frame comprises even lines of the original image at a different time. The process of capturing such images and transferring them to a display as two fields is known as "interlacing" and FIG. 1 of the accompanying drawings illustrates how two such fields are scanned to form an interlaced image. This type of interlacing uses two input images from the same image source with a time difference therebetween.

US2003/0117349 discloses an example of an interlacing technique where odd fields are used for one image of a stereo pair and each even fields are used for the other image. It is known to use this technique in combination with liquid crystal shutter glasses in order to provide a stereoscopic display. Such shutter glasses are synchronised in operation to the display of the fields such that the left eye shutter is open, say, for the odd fields and closed for the even fields whereas the right eye shutter is open for the even fields and closed for the odd fields. However, interlacing is limited to combining images at line resolution and the effective reduced update rate of the display results in visible flickering of the displayed images.

FIG. 2 of the accompanying drawings illustrates an interlacing technique, for example as disclosed in U.S. Pat. No. 6,573,928, for use in autostereoscopic displays. In such displays, right eye and left eye images are spatially multiplexed on a single display screen, which cooperates with a parallax optic to create left eye and right eye viewing regions. When an observer's left and right eyes are disposed in the left eye and right eye viewing regions, respectively, a 3D image is perceived without the need for any viewing aids.

Each 2D image is formed as rows and columns of groups of red, green and blue pixels constituting composite colour pixel groups. Each image comprises n columns of such composite colour groups and spatial multiplexing is provided by interlacing the individual colour component pixels from the same row in the left and right images to form an interlaced image. As illustrated in FIG. 2, interlacing may be performed in two steps.

In the first step, the composite colour groups from the left and right images are interlaced in each line so as to alternate with each other. In the second step, some of the individual colour component pixels are moved to achieve the final interlaced image. In particular, the central colour component pixel of each group is moved to the central position in the next group to the right. This results in spatial multiplexing so that the pixels cooperate with a parallax optic to form the left and right eye viewing regions.

Software is available, for example as disclosed in U.S. Pat. No. 6,594,083 and on the internet at http://www.imtech.c-se.dmu.ac.uk/mcf/ilace and http://www.promagic.net, for interlacing multiple images for use with lenticular-type 3D displays.

A common feature of these known techniques is that the interlacing pattern is intrinsic to the display. In particular, interlacing is performed by dedicated hardware or software in accordance with the fixed and specific requirements for the particular application.

DISCLOSURE OF THE INVENTION

According to a first aspect of the invention, there is provided an apparatus for interlacing a plurality of input images to form an output image, comprising a programmable memory for storing an interlacing configuration pattern defining a mapping from pixels of the input images to pixels of the output image, and a pixel data rearranger for rearranging pixel data in accordance with the pattern stored in the memory, the pattern comprising at least one instruction defining a source or destination image and the position of a source image pixel relative to a destination image pixel.

According to a second aspect of the invention, there is provided an apparatus for deinterlacing an input image to form a plurality of output images, comprising a programmable memory for storing a deinterlacing configuration pattern defining a mapping from pixels of the input image to pixels of the output images, and a pixel data rearranger for rearranging pixel data in accordance with the pattern stored in the memory, the pattern comprising at least one instruction defining a source or destination image and the position of a source image pixel relative to a destination image pixel.

The or each input image may comprise a sequence of input images and the or each output image may comprise a sequence of output images.

The pixels may be colour component pixels. The apparatus is therefore capable of interlacing multiple input images at the subpixel level.

The memory may be programmed with the pattern during manufacture of the apparatus and may be non-reprogrammable.

The memory may be arranged to contain a plurality of patterns and the apparatus may comprise a controller for selecting any one of the patterns for use. The controller may be responsive to an input signal for selecting and reselecting any one of the patterns during operation of the apparatus.

The memory may be reprogrammable for loading or changing the pattern during operation of the apparatus.

The memory may be arranged to be programmed or reprogrammed with the pattern or a fresh pattern by data received with the input image or any of the input images.

The memory may be arranged to be programmed with the deinterlacing pattern which is derived from an interlacing pattern supplied with the input image or any of the input images.

The pattern may define a mapping of a proper subset of input image pixels to a proper subset of output image pixels and the rearranger may be arranged to repeat the pattern for a plurality of the proper subsets. The rearranger may be arranged to repeat the pattern so that the plurality of subsets substantially tiles at least one of the input and output images. The plurality of subsets may substantially tile the or each output image.

The at least one instruction may define a colour component and the position may represent the position of a group of source colour component pixels forming source composite colour group relative to a group of destination colour component pixels forming a destination composite colour group.

The rearranger may be arranged to generate each output image pixel in turn.

The apparatus may comprise an input buffer for the or each input image or sequence of input images.

The apparatus may comprise an output buffer for the or each output image or sequence of output images.

The or each output image may be built up from a plurality of input images received in sequence.

The apparatus may comprise a pixel data processor for processing each pixel data during rearrangement by the rearranger.

Input image data may be tagged to indicate to which input image the data relate.

According to a third aspect of the invention, there is provided a display comprising an apparatus according to the first or second aspect of invention and a display device.

The display device may be a multiple view directional display device and the rearranger may be controlled by the pattern for spatially multiplexing the input image or sequences of input images. The display device may comprise a spatial light modulator and a parallax optic.

According to a fourth aspect of the invention, there is provided an image compressor comprising a correlation detector for detecting correlation in an input image and establishing therefrom an interlacing configuration pattern describing a mapping from pixels of the input image to pixels of an interlaced image, a pixel data rearranger for rearranging pixel data in accordance with the pattern so as to generate the interlaced image, and a data compressor for compressing the interlaced image.

According to a fifth aspect of the invention there is provided an image decompressor comprising a data decompressor for decompressing a compressed interlaced image from an image compressor according to the fourth aspect of the invention, and a further pixel data rearranger for rearranging the pixel data of the decompressed interlaced image in accordance with a deinterlacing configuration pattern which is the inverse of the interlacing configuration pattern to provide an output image.

An embodiment of the present invention provides reconfigurable interlacing apparatus with the advantage that the pixel rearrangement performed by the apparatus can be changed according to the particular requirements of the device or apparatus to which the output image is sent. Reconfiguration of the interlacing apparatus can be performed easily, quickly and as often as is required, and it is possible to use a compact representation for the mapping from pixels of the input images to pixels of the output image. When used to drive a display, the interlacing apparatus is not limited to particular geometries of lenslet, and is capable of performing interlacing at the subpixel level, arbitrarily combining different pixels from different images to form the output image. The reordering can be arranged to match the optical properties of the display.

BRIEF DESCRIPTION OF THE DRAWINGS

Reference will now be made, by way of example, to the accompanying drawings, which:

FIG. 5 shows one possible representation of an interlacing configuration pattern used in an embodiment of the present invention;

FIG. 6 shows the use of an interlacing configuration pattern to map pixels from two input images to a single output image;

BEST MODE FOR CARRYING OUT THE INVENTION

Figure 3:
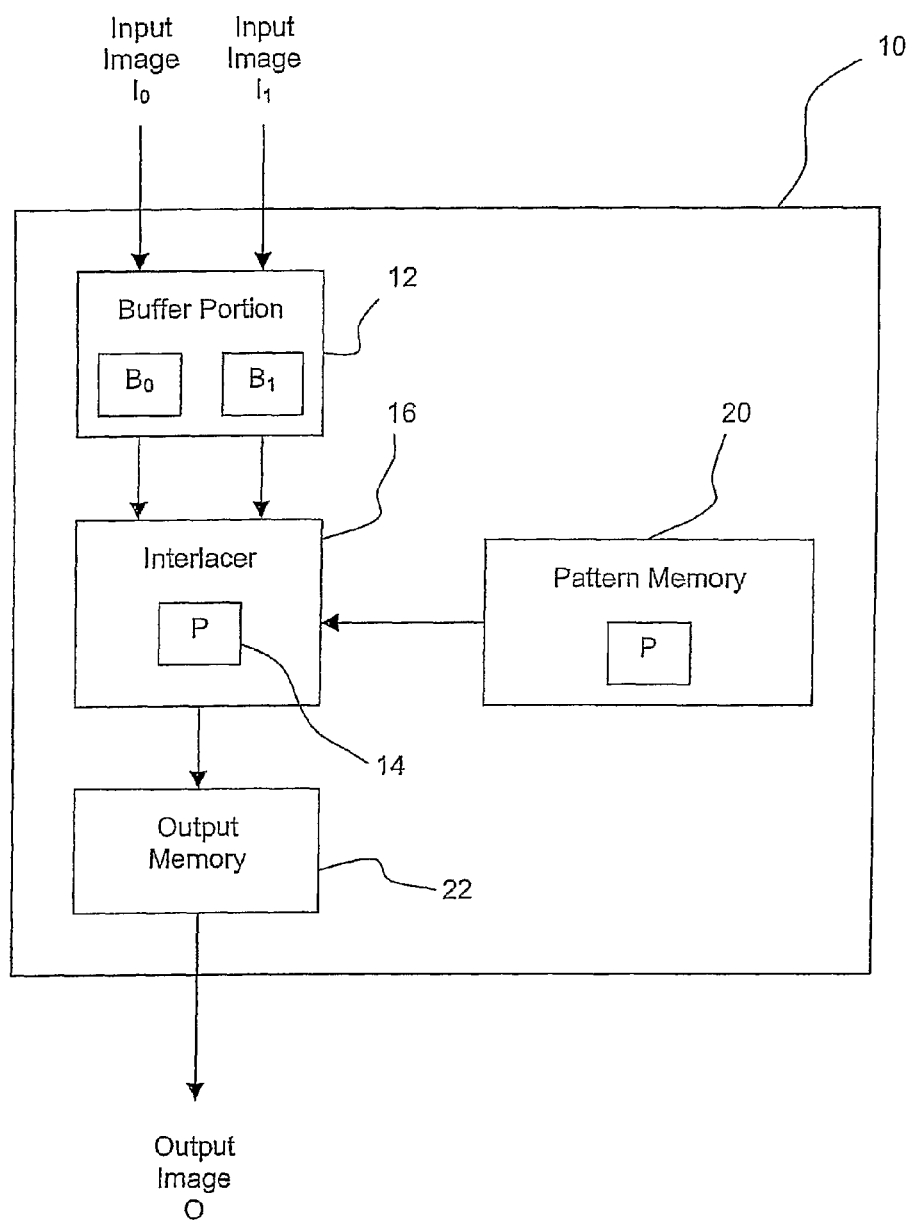
FIG. 3 is a block diagram illustrating a first embodiment of the present invention.

FIG. 3 is a block diagram illustrating an apparatus 10 for interlacing two input images $I_0$ and $I_1$ to form an output image O. The apparatus 10 according to the first embodiment comprises a buffer portion 12 including buffers $B_0$ and $B_1$ corresponding to the input images $I_0$ and $I_1$ respectively. The interlacing apparatus 10 also comprises an interlacer 16 (also referred to herein as a pixel data rearranger) having access to a programmable pattern memory 20, which is shown in FIG. 3 as having stored therein an interlacing configuration pattern P. The interlacer 16 also has a temporary interlacing configuration pattern store 14 for storing the configuration pattern P locally. The interlacing apparatus 10 also comprises an output memory 22.

In operation of the first embodiment of the present invention, two input images $I_0$ and $I_1$ are received at the interlacing apparatus 10 and buffered in respective buffers $B_0$ and $B_1$ of the buffer portion 12 before being presented to the interlacer

16. Before interlacing commences, the interlacing configuration pattern P is transferred from the pattern memory 20 to the local pattern store 14 of the interlacer 16. The interlacing configuration pattern P defines a mapping from pixels of the input images $I_0$ and $I_1$ to pixels of the output image O. As will be described in more detail below, the interlacer 16 rearranges pixel data received from the buffer portion 12 in accordance with the interlacing configuration pattern P, sending the output data for storage in the output memory 22 before transferral out of the interlacing apparatus 10 as the output image O.

Figure 4:
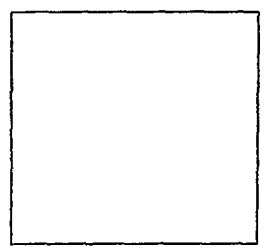
FIG. 4 is a diagrammatic representation of how an interlacing configuration pattern represents a mapping from pixels of input images to pixels of an output image in an embodiment of the present invention.
Figure 4:
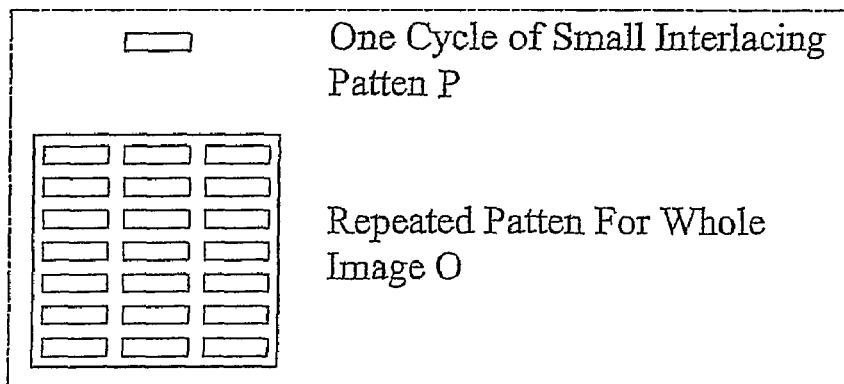
Figure 4:
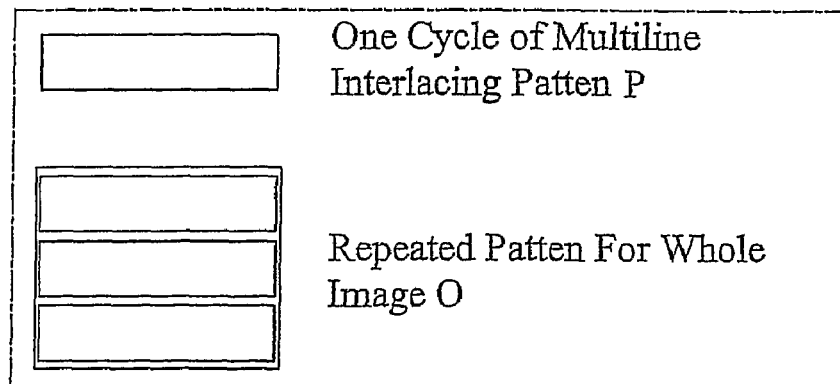

Use of the interlacing configuration pattern P to define the mapping from pixels of the input images $I_0$ and $I_1$ to pixels of the output image O is shown diagrammatically in FIG. 4. Interlacing apparatus 10 according to the first embodiment of the present invention considers the interlacing configuration pattern P to be one cycle of a two-dimensional periodic pattern, with the pattern being repeated so that it fills the entire output image O. The interlacer 16 refers to the interlacing configuration pattern P to pick the pixels or subpixels from each of the input images $I_0$ and $I_1$ as specified in the interlacing configuration pattern P to generate the interlaced output image O.

For the majority of interlacing applications, the interlacing configuration pattern P can easily be reduced to a minimal, compact form (a single cycle) that is repeated across a row of the output image O for every line of the output image O, as shown at (a) of FIG. 4. Alternatively, the interlacing configuration pattern P could define the mapping for a single or a group of rows in the output image O, as shown at (b) in FIG. 4. One cycle of the interlacing configuration pattern P may also refer to a block of pixels having an arbitrary width and height. In each illustrated case, the interlacing configuration pattern covers the entire output image O by tiling. The interlacer 16 holds a record of its current position in the interlacing pattern and traverses the output image structure, using the interlacing configuration pattern to transfer appropriate pixels or subpixels from the buffer portion 12 to form the output image O.

Figure 2:
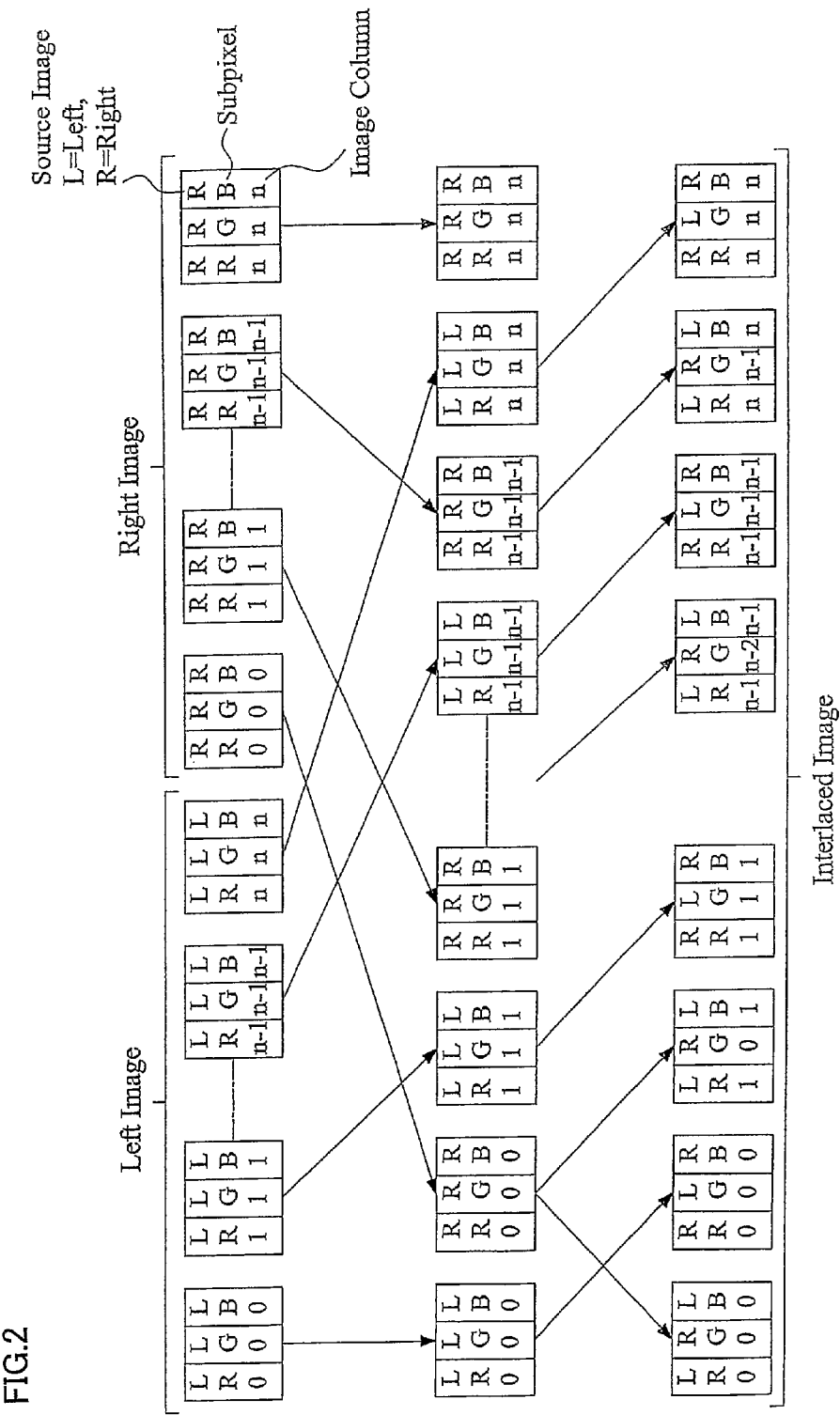
FIG. 2, also discussed hereinbefore, illustrates a known interlacing technique for use in autostereoscopic displays.
Figure 5:
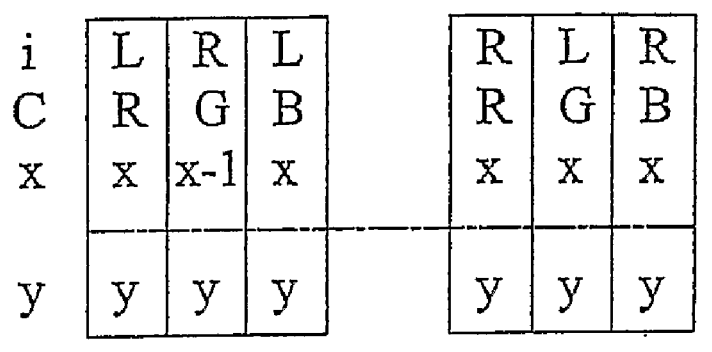

One possible representation of the interlacing configuration pattern P will now be described within the context of interlacing for an autostereoscopic display, for example as described above with reference to FIG. 2. For this representation, the convention iCx/y is used to describe where the current subpixel in the output image O is taken from, where i defines the input image number, C defines the colour component of the input pixel and x and y represent the horizontal and vertical offset of the input pixel, relative to the start of the cycle. For example, an interlacing configuration pattern for stereo images as described in U.S. Pat. No. 6,573,928 and as shown above in FIG. 2, in which colour subpixels are taken alternately from each input image in the order R, G, B, can be represented by the following interlacing configuration pattern: {0R0/0; 1G-1/0; 0B0/0; 1R0/0; 0G0/0; 1B0/0}. FIG. 5 shows an alternative way of representing the same interlacing configuration pattern.

An example of the use of the above interlacing configuration pattern P in the first embodiment will now be described with reference to FIG. 6. In the example shown in FIG. 6, two input images IMAGE 0 and IMAGE 1 are being interlaced to form a final interlaced image O. The first pixel in a block corresponding to the start of interlacing configuration pattern P is shown as pixel 0, with pixel −1 being the pixel before the start of the block. Where the interlacing configuration pattern P refers to a pixel outside of the image, the interlacer 16 should choose an alternative suitable pixel such as the nearest relevant subpixel, the value of the current subpixel, or simply left blank.

In step 1 of FIG. 6, the interlacer 16 refers to the first instruction in the interlacing configuration pattern P, which is 0R0/0. In step 1, the horizontal and vertical offsets in the interlacing configuration pattern P are relative to pixel 0 in the input images. Therefore, in step 1, the interlacer 16 is directed to read the R colour component of pixel 0 of IMAGE 0, which is schematically represented as D. This value D is mapped into the first subpixel of the output image O, which is the R colour component of the first RGB pixel.

In step 2 of FIG. 6, the interlacer 16 moves to the next instruction in the interlacing configuration pattern P, which is 1G-1/0. This directs the interlacer 16 to read from the G colour component of pixel −1 of IMAGE 1, which is K. This value K is placed in the next available subpixel of the output image O, which is the G colour component of the first pixel.

In step 3, the interlacer 16 operates according to the next instruction in the interlacing configuration pattern P, which is 0B0/0. This directs the interlacer 16 to read the value of the B colour component of pixel 0 of IMAGE 0, which is F, and this value is stored in the next subpixel of the output image O, the B colour component of the first pixel.

A similar process is repeated in steps 4 to 6, which fills the RGB colour component subpixels of the second pixel of the output image O with the respective values M, E and O. This process is repeated until the entire output image O is filled.

A more compact representation of the interlacing configuration pattern can be achieved by associating one or more rules or assumptions with a given interlacing configuration pattern P. For example, if it is known in advance that subpixels are to be allocated to the output image O in the order RGB, then the above representation described with reference to FIG. 5 can be represented instead by the sequence 0 1 0 1 0 1, where "0" signifies that the subpixel is taken from the first image $I_0$ and "1" indicates that the subpixel should be taken from the second image $I_1$. Assumptions can also be associated with the interlacing configuration P to specify how to handle any other aspect of the interlacing depending, for example, on the target display; for example the assumptions might specify how interlacing of the first column of pixels is performed.

Figure 7:
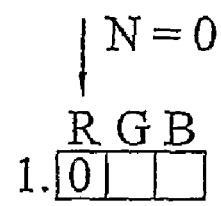
FIG. 7 schematically illustrates an extension to the interlacing configuration pattern including instructions for literal pixel value substitution.
Figure 7:
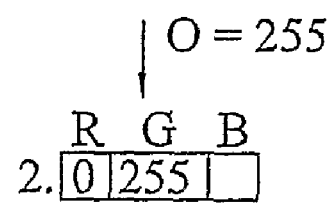
Figure 7:
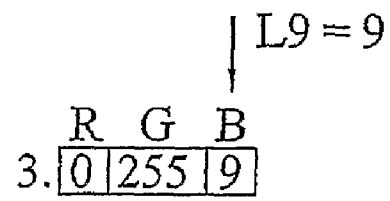

The representation of the interlacing configuration pattern P can be extended by the inclusion of other instructions for the interlacer 16. For example, it may be desirable to substitute literal subpixel values for the purposes of testing or to match driving properties of a specific display. Such additional instructions may include, for example, the instructions "O", "N" and "L", where "O" stands for "on", "N" stands for "off" and "L" stands for "literal". Where the interlacer 16 encounters an "O" instruction, it would insert the value of 255 into the next subpixel of the output image O (or any other value assigned to "on"). When the interlacer 16 encounters an "N" instruction, it would insert the value of 0 into the next subpixel of the output image O (or any other value assigned to "off"). The "L" instruction would be followed by the value which should be written to the next subpixel of the output image O so that the instruction "L9" would indicate to the interlacer 16 that the value 9 should be inserted into the next subpixel of the output image O. FIG. 7 illustrates the values written to the output image for the example instruction sequence "N O L9".

Figure 8:
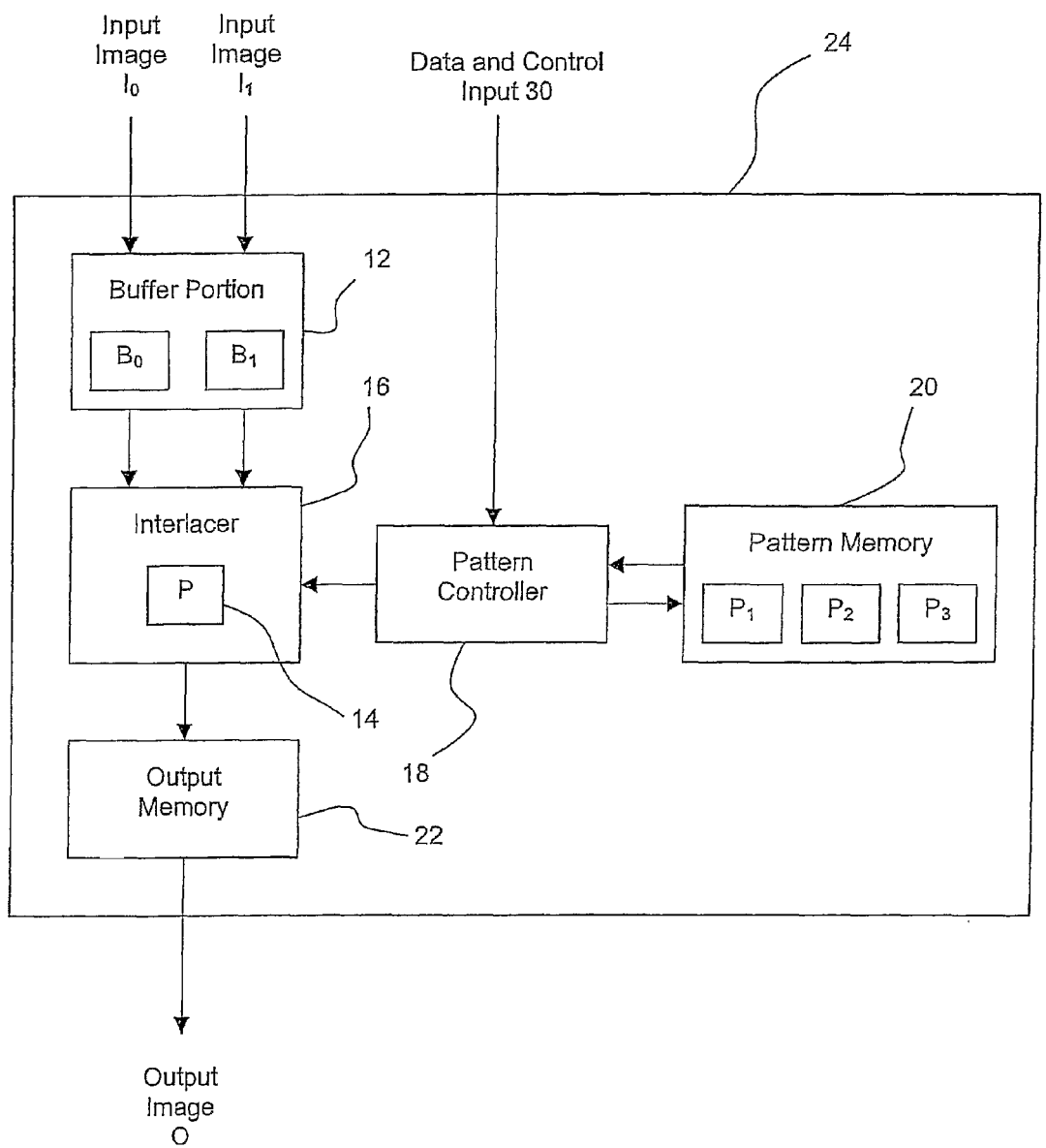
FIG. 8 is a block diagram illustrating interlacing apparatus according to a second embodiment of the present invention.

FIG. 8 is a block diagram illustrating an interlacing apparatus 24 according to a second embodiment of the present invention. The second embodiment differs from the first embodiment by including a pattern controller 18 arranged between the interlacer 16 and the pattern memory 20 and having a data and control input 30 for receiving data and control signals from the exterior of the interlacing apparatus

24. In the second embodiment, the pattern memory 20 is also adapted to hold a plurality of interlacing configuration patterns $P_1$, $P_2$ and $P_3$.

The second embodiment allows the interlacing configuration pattern P used by the interlacer 16 to be changed at any time and replaced by another interlacing configuration pattern from the pattern memory 20 according to the type of interlacing required. Such a change might be triggered, for example, by a control signal received at the data and control input 30 specifying the interlacing configuration pattern to be used. The pattern controller 18 would select the appropriate pattern from the pattern memory 20 and send it to the interlacer 16 for use in its subsequent processing.

For example, if the interlacing apparatus 24 is connected to a display device, the display device could indicate to the interlacing apparatus 24 by means of the data and control input 30 what kind of interlacing is required to drive the display, and the interlacing apparatus 24 would update itself with the appropriate interlacing configuration pattern. One possible method for the display device to communicate the display type to the interlacing apparatus 24 is by using Extended Display Identification Data (EDID) as specified by the Video Electronics Standards Association (see http://www.vesa.org). The second embodiment would also allow new interlacing configuration patterns to be loaded into the pattern memory 20 during use.

Figure 9:
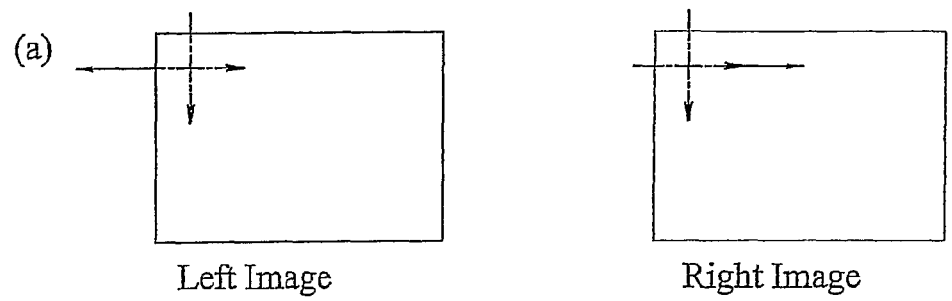
FIG. 9 illustrates the use of the second embodiment to adjust the Zero Disparity Plane of a display.
Figure 9:
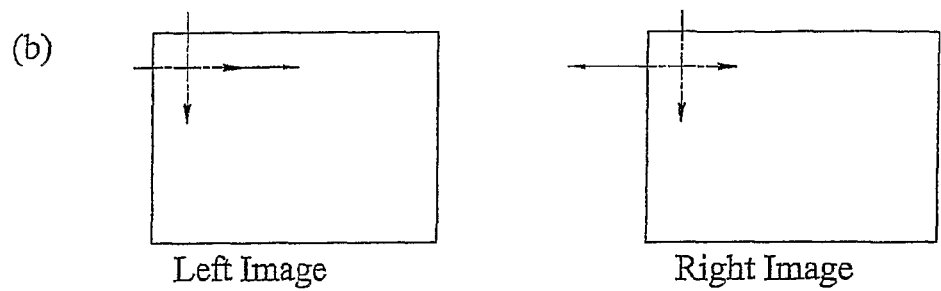
Figure 10:
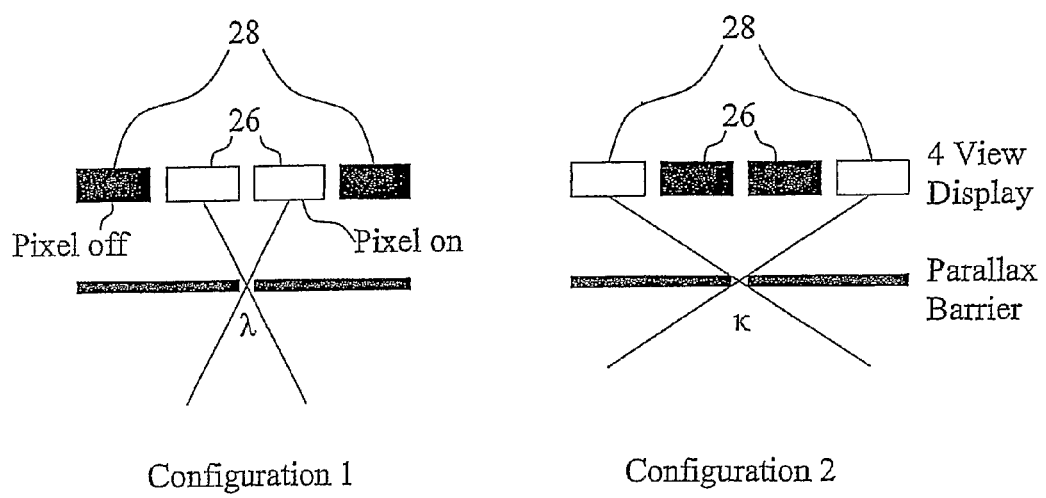
FIG. 10 shows the use of the second embodiment to switch the viewing angle of a multiple view directional display.

The second embodiment has the flexibility to allow adjustment of the global vertical disparity in an autostereoscopic display device, as follows. When the interlacing apparatus 24 is used in conjunction with an autostereoscopic display device, the input images $I_0$ and $I_1$ would be a sequence of stereoscopic image pairs, with the interlacer 16 being operated to select pixels from the input images to generate the sequence of output images. Since the content of an interlacing configuration pattern determines where on each of the input images the interlacer 16 begins to select pixels, and since the second embodiment allows the interlacing configuration pattern to be changed during use, this allows the interlacing apparatus 24 according to the second embodiment to choose and to change a position of the origins of the respective images. By moving the origin of one or more of the input images, it is possible to make a relative translation or registration adjustment between them, and where the images are a stereoscopic pair then this can be used to adjust the global vertical disparity. If the display device driven by the interlacing apparatus 24 is a multiview type having more than one monoscopic view, then this method provides a convenient control to adjust the position of the image for each viewer.

Where the driven display device is an autostereoscopic display device, the flexibility provided by the second embodiment also allows the adjustment of the Zero Disparity Plane (ZDP) of the display. The ZDP is the plane where there is no disparity between a pair of stereo images if the input images constitute a stereo pair. Moving the origin of the images in a horizontal and opposite direction for each image leads to an adjustment of the ZDP. When the images move away from each other, as illustrated at (a) of FIG. 9, the ZDP of the displayed image moves backward. When the images move towards each other, as illustrated at (b) of FIG. 9, the ZDP of the displayed image moves forward. Adjustment of the ZDP differs from adjustment of the global translation described above, since in the former case the images are adjusted to move towards or away from each other, while in the latter case the images are independently moved up and down, left and right.

Where the interlacing apparatus 24 of the second embodiment is used to drive a display device of the multiview type using a parallax barrier, the ability to switch between interlacing configuration patterns allows the viewing angles of the different views to be changed during use. FIG. 10 illustrates this possibility for a four-view display device in which only two views are being used. For configuration 1 shown in FIG. 10, the interlacing configuration pattern used by the interlacer 16 would ensure that two adjacent pixels 26 in each group of four are allocated image data for display to the two different respective views, with the other two pixels 28 in the group receiving "off" data. This results in a narrow angle λ between the two views. For configuration 2 shown in FIG. 10, the interlacing configuration pattern is switched to one that allocates output data for the two views to the outer two respective pixels 28 in each group of four, and allocates "off" image data to the inner two pixels 26 in each group of four. This leads to a wide viewing angle κ.

In certain applications the interlacing configuration pattern can usefully be chosen in dependence upon the input image data. For example, in a display having a parallax barrier it is known that some designs of barrier can introduce particular colour artefacts in particular circumstances. The present embodiment would allow the barrier to be switched between different optical configurations according to the circumstances. For example, if it is detected that a particular input image would lead to such artefacts being exhibited by the display, the interlacing apparatus could be controlled to change to a more suitable interlacing configuration pattern, with the display likewise being switched to a configuration corresponding to the new interlacing pattern. Such detection and control could occur either within the interlacing apparatus, or outside the apparatus with a signal being used to control the selection of interlacing configuration pattern within the apparatus.

Figure 1:
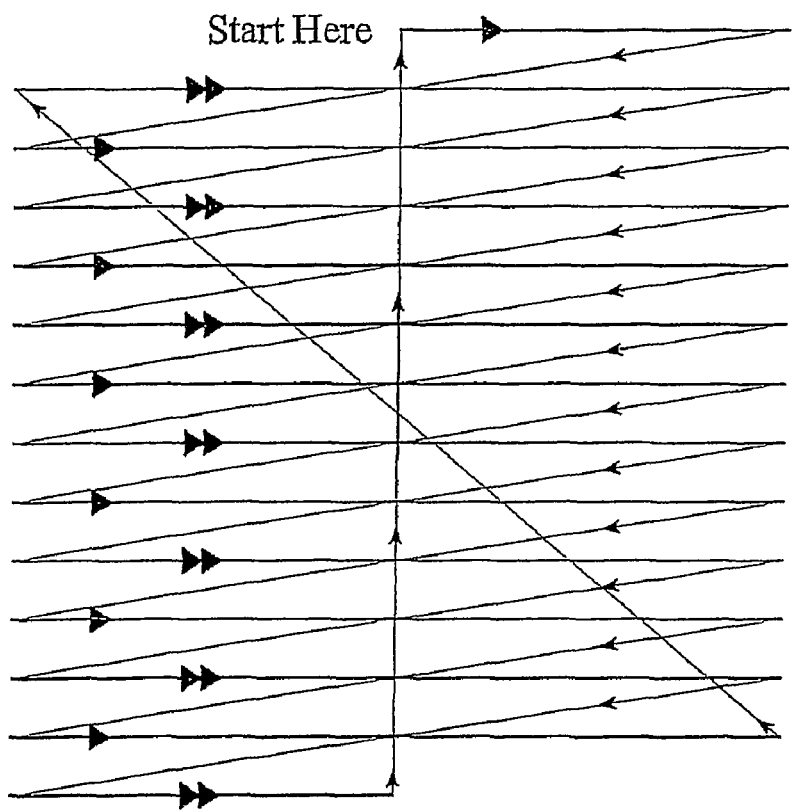
FIG. 1, discussed hereinbefore, illustrates the known technique of field interlacing in which two field images are combined together to form a single frame.

Some displays build their output image up from several images over a period of time in a cumulative fashion. An example of this is the field interlacing technique described above with reference to FIG. 1 where the output frame image is built up from two fields over two passes. In the first pass a first field is used to fill the odd lines of the output frame image, and in the second pass a second field image is used to fill the even lines of the output frame image; other special displays also build up the output image over time, such as the one described in U.S. Pat. No. 6,476,850. An example of a time-dependent interlacing apparatus embodying the present invention will now be described with reference to FIG. 11.

Figure 11:
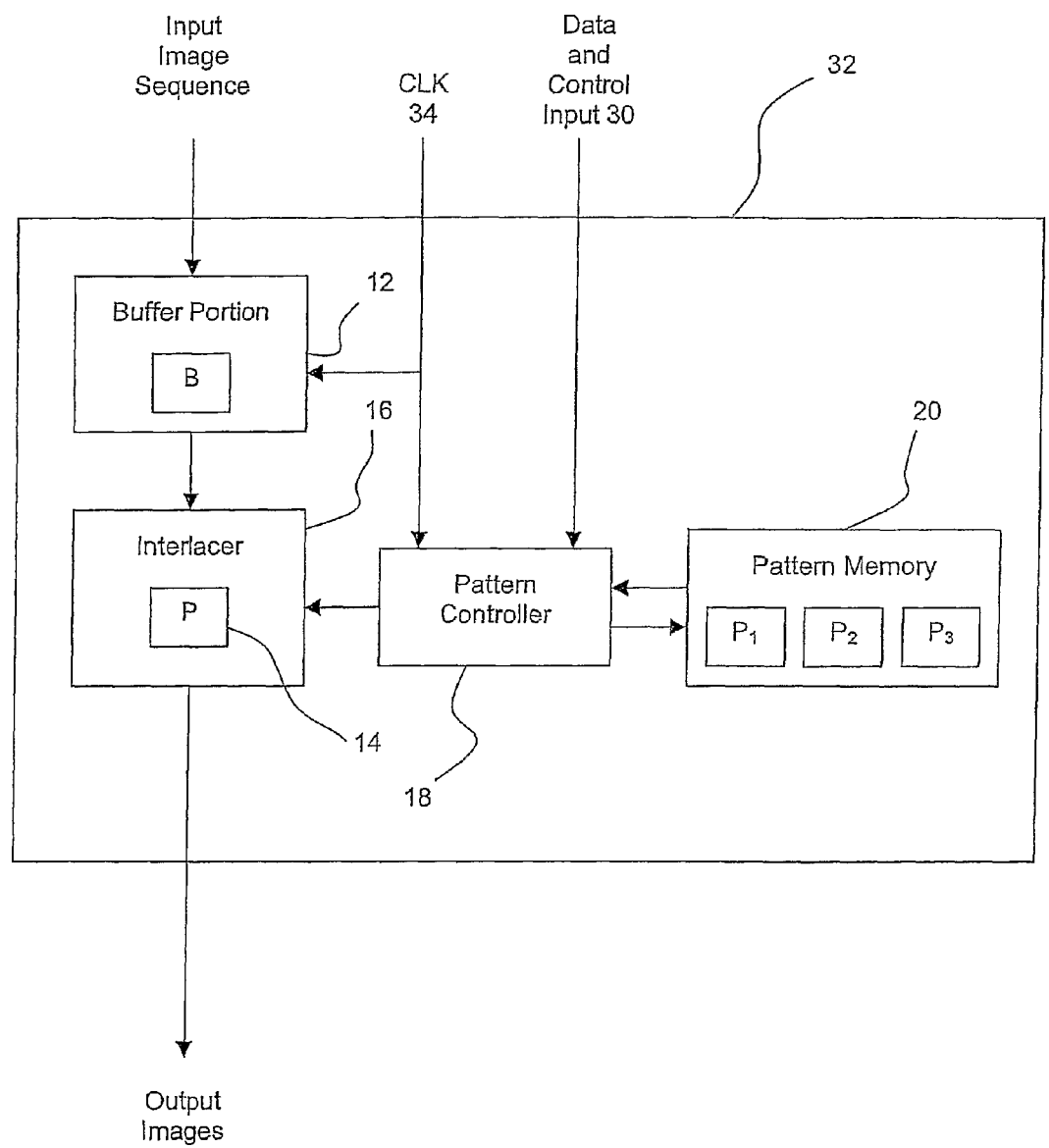
FIG. 11 is a block diagram illustrating an interlacing apparatus according to a third embodiment of the present invention.

FIG. 11 is a block diagram illustrating interlacing apparatus according to a third embodiment of the present invention. The third embodiment differs from the second embodiment in that a time sequence of images to be used to build up an output image is input into the interlacing apparatus 32 via a single input image sequence input. The image data is buffered by the buffer portion 12 before being passed onto the interlacer 16. The third embodiment also differs from the second embodiment in that data output from the interlacer 16 is directly output from the interlacing apparatus 32 without use of the output memory 22 of the second embodiment. Additionally, a clock input is provided, and in use a clock signal CLK presented at the clock input 32 is passed to the pattern controller 18 and to the buffer portion 12.

In the third embodiment of the present invention, a first image in an input image sequence is received at the interlacing apparatus 32 and buffered in the buffer portion 12. The clock signal CLK at the clock input 34 then triggers the transfer of the first input image to the interlacer 16 and at the same time directs the pattern controller 18 to fetch an interlacing configuration pattern from the pattern memory 20 that is appropriate for the first image in the sequence; this interlacing configuration pattern is loaded into the pattern store 14 in the interlacer 16 for use in mapping the pixels of the first input image to the pixels of the output image. For example, in the field interlacing technique described above with reference to FIG. 1, the interlacing configuration pattern loaded into the interlacer 16 for the first input image in the sequence would direct lines of the first input image to the odd lines of the output image.

A second input image of the sequence is then received at the interlacing apparatus 32 and buffered in the buffer portion 12. The clock signal CLK at the clock input 34 then triggers the transfer of the second input image of the sequence to the interlacer 16, and at the same time causes the pattern controller 18 to load an interlacing configuration pattern into the interlacer 16 that is appropriate for the second image of the sequence. In the above example of field interlacing according to the technique of FIG. 1, the interlacing configuration pattern loaded into the interlacer 16 for the second image would cause the interlacer 16 to direct image data from the second input image to the even lines of the output image. Output image signals from the interlacer 16 are made available for instantaneous use by the device that is being driven by the interlacing apparatus 32.

The above steps continue until the final input image in the sequence is processed to produce the final output image. Further details of how the interlacing configuration pattern can be extended to include special instructions for such cumulative interlacing techniques will be described below with reference to the fourth embodiment of the present invention.

The third embodiment can also be applied to a multiple view directional display device in the following manner. A repeating sequence of images is presented at the input, with each image in the repeating sequence being destined for a different respective view. The image data in successive images directed towards each view can change so that each view receives (for example) a moving picture sequence, the refresh rate in each view being high enough to allow comfortable viewing. Therefore, for each input image received at the input, the clock signal CLK at the clock input 34 triggers the transfer of the input data to the interlacer 16, and at the same time causes the pattern controller 18 to load an interlacing configuration pattern into the interlacer 16 that is suitable to cause the interlacer 16 to direct the received image data to the appropriate set of pixels of the multiple view display to cause the image data to be displayed in the correct view. Such time-dependent interlacing can be applied to a multiple view directional display device having any number of views, limited in practice by the need to maintain an adequate refresh rate for each view. The image data presented to each view need not change between successive time frames. This embodiment is also applicable to an autostereoscopic display device having left and right views, where input images are directed alternately to the left and right views by use of different respective interlacing configuration patterns. A further variation of the third embodiment when applied to a multiple view directional display device is where the successive images received at the input are interlaced as appropriate to direct them to one view for a predetermined time period, with the interlacing configuration pattern then being changed so as to direct the images to a different view. Other such variations would readily be apparent to the skilled person.

Although the second embodiment is described as having spatially multiplexed inputs and the third embodiment as having time multiplexed inputs, it will be appreciated that a combination of these is possible in which the input images are both spatially and time multiplexed. Other such combinations of features from different embodiments described elsewhere in this description will be readily apparent to the skilled person. It will also be appreciated that image data input to an interlacing apparatus embodying the present invention may itself be pre-interlaced, for example where interlacing apparatuses are daisy-chained.

Figure 12:
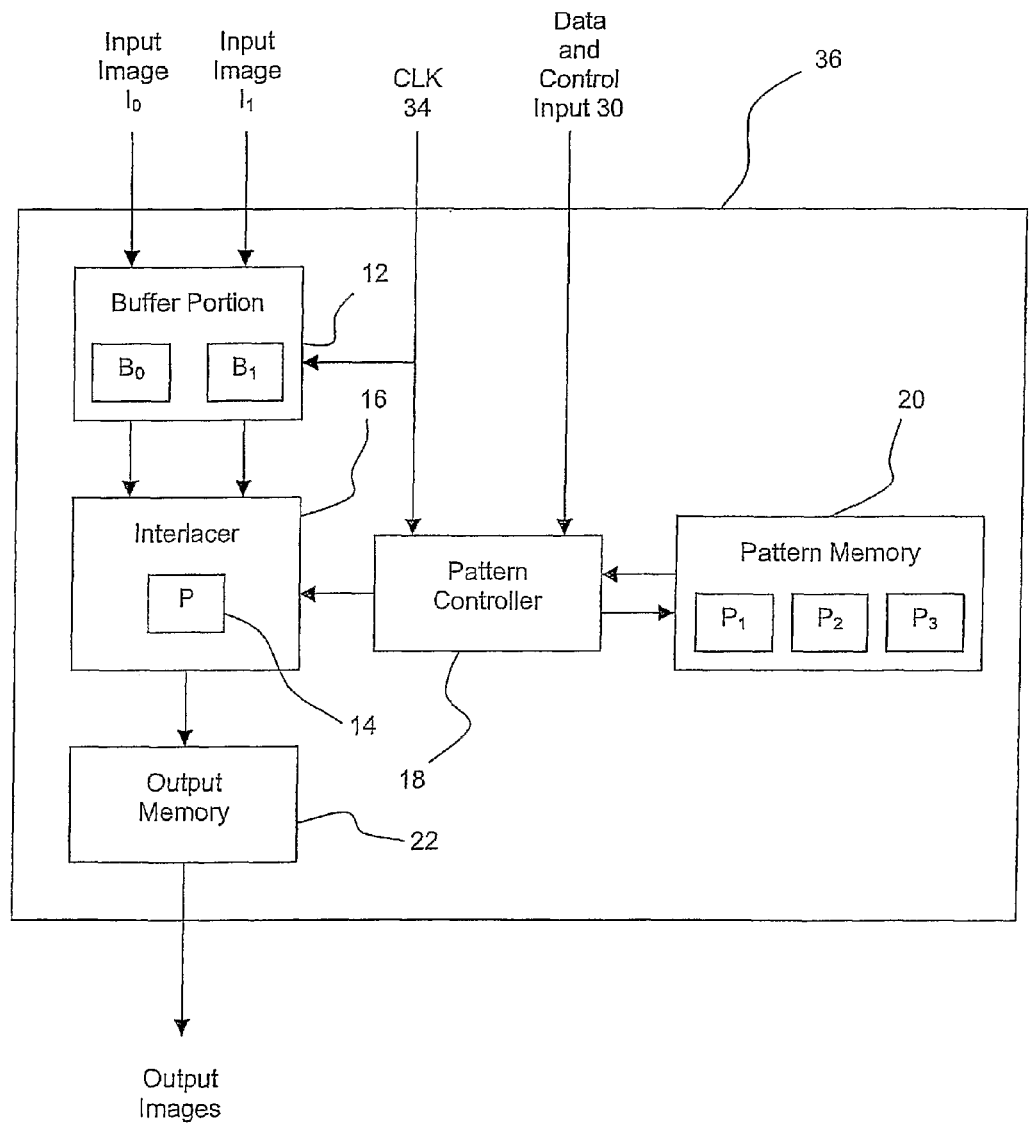
FIG. 12 is a block diagram illustrating an interlacing apparatus according to a fourth embodiment of the present invention.

FIG. 12 is a block diagram illustrating an interlacing apparatus 36 according to a fourth embodiment of the present invention. The fourth embodiment differs from the third embodiment in that an output memory 22 is arranged to receive output data from the interlacer 16. In the fourth embodiment, data output from the interlacer 16 can also be passed directly to the exterior of the apparatus 36 for immediate use as well as being passed to the output memory 22 which is able to build up and store a cumulative output image. The fourth embodiment also has separate inputs for receiving respective input images $I_0$ and $I_1$ as in the second embodiment, and separate buffer areas $B_0$ and $B_1$ in the buffer portion 12.

Operation of the third and fourth embodiments of the present invention to perform cumulative interlacing can employ an extension of the instruction set available for use in constructing an interlacing configuration pattern over those which have already been described above. For example, where each individual input image of a time sequence of images is being processed by the interlacer 16, image data is directed to alternate lines of the final output image, it is possible to have an instruction available which directs the interlacer to skip over individual pixels, or whole lines of pixels, in the output image. It is also conceivable that, in certain applications, it would be necessary that certain pixels of the output image are filled with certain other pixels of the output image, rather than of any input image, or with values that depend on output image pixels; extra instructions to provide this functionality are therefore desirable.

Figure 13:
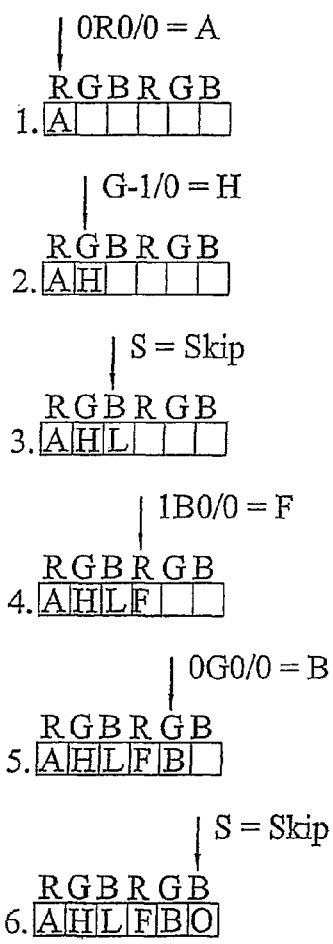
FIG. 13 illustrates operation of the fourth embodiment including an expanded interlacing configuration pattern instruction set.

FIG. 13 is an illustrative diagram illustrating several steps performed by the interlacer 16 of the fourth embodiment based on an interlacing configuration pattern P including two new instructions. The first is a "skip" instruction, represented by the identifier "S", which directs the interlacer 16 to skip over the next subpixel in the output image. The second is an instruction represented with the notation Cx/y, without a preceding input image identifier i, which directs the interlacer 16 to take the next subpixel from the output image rather than from any one of the input images. The other type of instruction in FIG. 13 is the one represented by the notation iCx/y which is described above.

The sequence of instructions in the interlacing configuration pattern P illustrated in FIG. 13 is {0R0/0; G-1/0; S; 1B0/0; 0G0/0; S}. In step 1 as shown in FIG. 13, the interlacer 16 operates according to the instruction 0R0/0, which causes it to take the R colour component from the zero offset pixel (pixel 0) from IMAGE 0, which is A; this value is written to the first subpixel in the output image. In step 2, the instruction G-1/0 directs the interlacer 16 to read the next subpixel value from the G colour component of the offset "−1" pixel of the output image, which is H; this value is written to the next (G colour component) subpixel of the output image. In step 3, the interlacer 16 is directed to skip over the next subpixel in the output image, which is L, and this value is left unchanged in the output image. In step 4, the instruction 1B0/0 directs the interlacer 16 to read the B colour component of the zero offset pixel (pixel 0) of IMAGE 1, which is R, and this value is written to the next subpixel of the output image. In step 5, the instruction 0G0/0 directs the interlacer 16 to read the G colour component from the zero offset pixel (pixel 0) of IMAGE 0, which is B, and this value is written to the next subpixel of the output image. Finally, in step 6 the "skip" instruction S directs the interlacer 16 to skip over the next subpixel value O in the output image.

It will be appreciated that cumulative interlacing can be performed without an output memory portion 22 using, for example, a pixel-addressable display where data can be written to specified pixels without having to write to each pixel in sequence.

The fourth embodiment can also be applied (with or without cumulative interlacing) to a multiple view directional display device, with multiple images presented at the separate respective inputs being destined for different respective views of the display. The apparatus 36 illustrated in FIG. 12 shows only two inputs, but can easily be extended to have more than two inputs appropriate to a typical multiple view directional display device. In a particular time frame, the images received at different respective inputs are directed towards different respective views using an appropriate interlacing configuration pattern loaded into the interlacer 16, such that the image data for each view are directed to the appropriate set of pixels in the display device. The image data presented at the inputs can either be static or changed after each time frame. Likewise, the interlacing configuration pattern used for interlacing the multiple input images can be changed between time frames to change the allocation of inputs to views; this would enable viewers to select different views without changing the input data to the system, and would also enable certain designs of multiview displays to be correctly driven. This embodiment is equally applicable to an autostereoscopic display device having left and right views, where a pair of input images in each time frame are directed to the left and right views by use of an appropriate interlacing configuration pattern.

Figure 14:
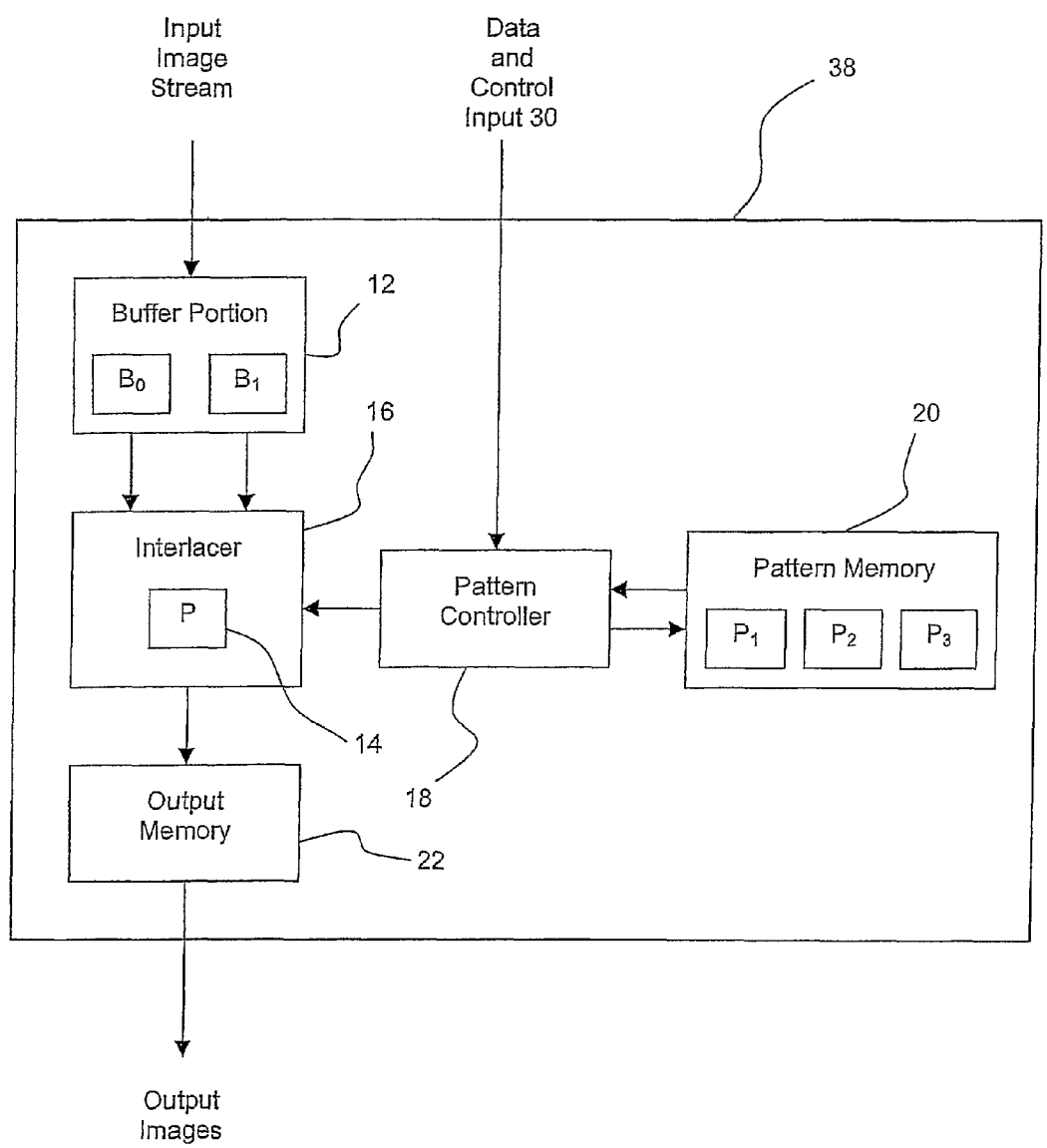
FIG. 14 is a block diagram illustrating an interlacing apparatus according to a fifth embodiment of the present invention.

FIG. 14 is a block diagram illustrating an interlacing apparatus 38 according to a fifth embodiment of the present invention. The fifth embodiment differs from the fourth embodiment in that a single image stream input is provided for the interlacing apparatus 38 connected to the buffer portion 12. The buffer portion 12 has separate buffer areas $B_0$ and $B_1$ for buffering data relating to different respective images, since the input image stream in this embodiment does not provide a time sequence of entire images as in the third embodiment, but rather the time relationship to the input images being interlaced is not predefined; there is also no clock input in the fifth embodiment. Instead, the incoming image data is "tagged" with additional bits which identify to which image the incoming data relates. The interlacing device 38 uses the tag information to separate the incoming input image data stream into individual input images which are buffered separately. When enough data has been received to allow interlacing to commence (for example, a few pixels, a whole line, or a whole frame) the interlacer 16 is instructed to commence interlacing according to the selected interlacing configuration pattern.

Figure 15:
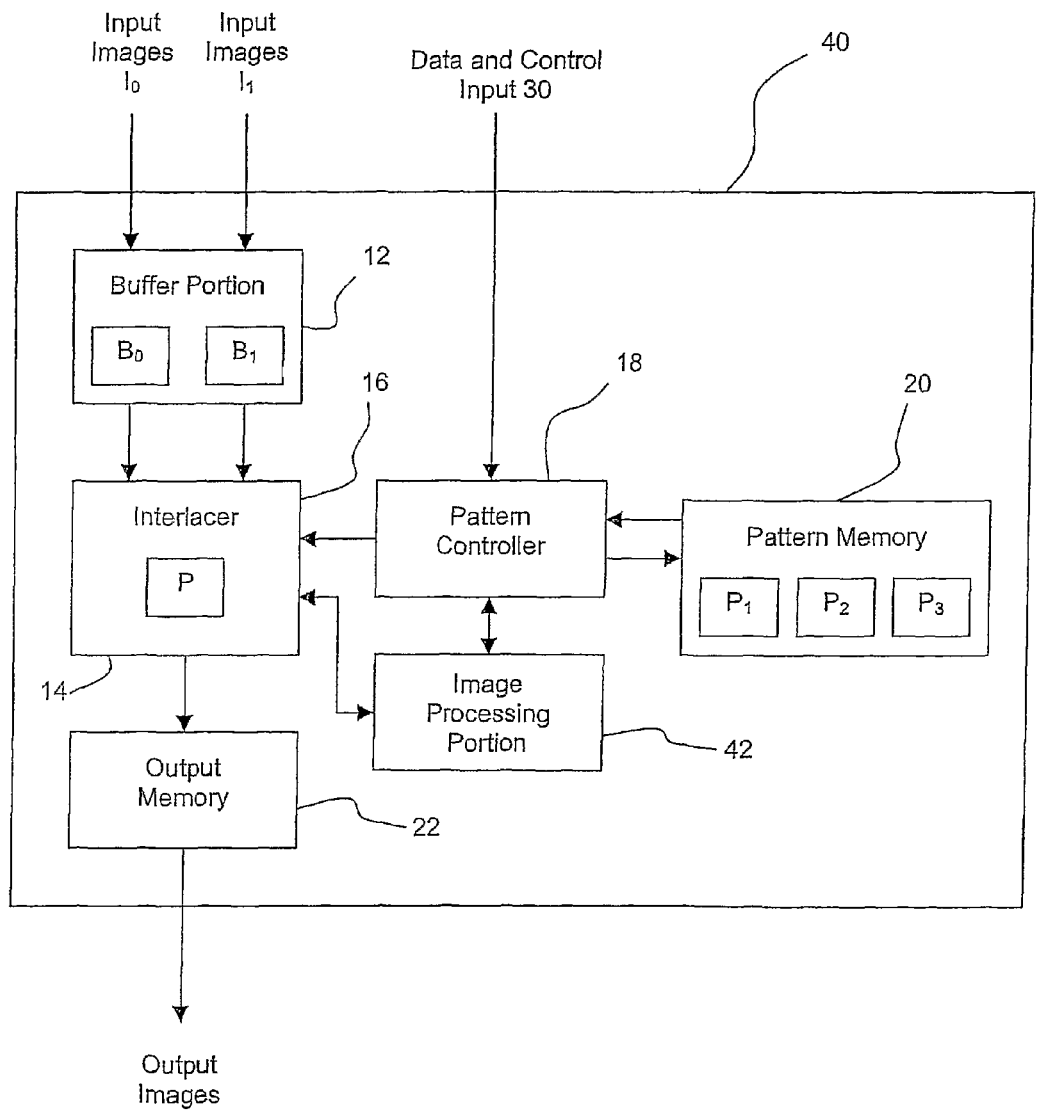
FIG. 15 is a block diagram illustrating an interlacing apparatus according to a sixth embodiment of the present invention.

FIG. 15 is a block diagram illustrating an interlacing apparatus 40 according to a sixth embodiment of the present invention. The sixth embodiment differs from the second embodiment described above by including an image processing portion 42 arranged in communication with the interlacer 16 and the pattern controller 18. In each of the first to fifth embodiments described above, the value transferred to the output image is either a value read from an input image, or a value read from the output image, or an absolute value specified by the instruction (for example, on, off or any other value). In the sixth embodiment, the image processing portion 42 allows the modification of pixel values for image processing purposes before being transferred to the output image. For example, using a Look Up Table (LUT), the image can be corrected for specific characteristics of the display being driven by the interlacing apparatus 40. The LUT holds a list of mappings that transform an input value to an output value. When a pixel is being transferred to the output image, the interlacer 16 cooperates with the image processing portion 42 to look up an output value in the LUT and places the new output value in the output image. There can be a separate LUT for each colour component. Other functions could be included, such as the scaling of each colour component by a linear factor, adding an offset, thresholding and so on. Such an embodiment can also be used to reduce cross-talk between neighbouring views in a multiple view directional display device by modifying the image data of the neighbouring views so as to attempt to cancel the cross-talk. A similar technique can be used to take account of the latency time of the driven display so as to attempt to cancel any residual image left over from a previous time frame.

In each embodiment described above, the interlacing apparatus traverses the output image structure, using the interlacing configuration pattern to determine which subpixels are sent to the current position in the output image. An alternative method is to traverse the input image structures, choosing subpixels as directed by the interlacing configuration pattern. These are not the only possibilities; for example, a combination of these two methods could be employed.

It will also be appreciated that the use of an interlacing configuration pattern as described above for the interlacing of a plurality of input images to produce an output image is equally applicable to the reverse process where an interlaced image is deinterlaced to produce a plurality of constituent images.

Figure 16:
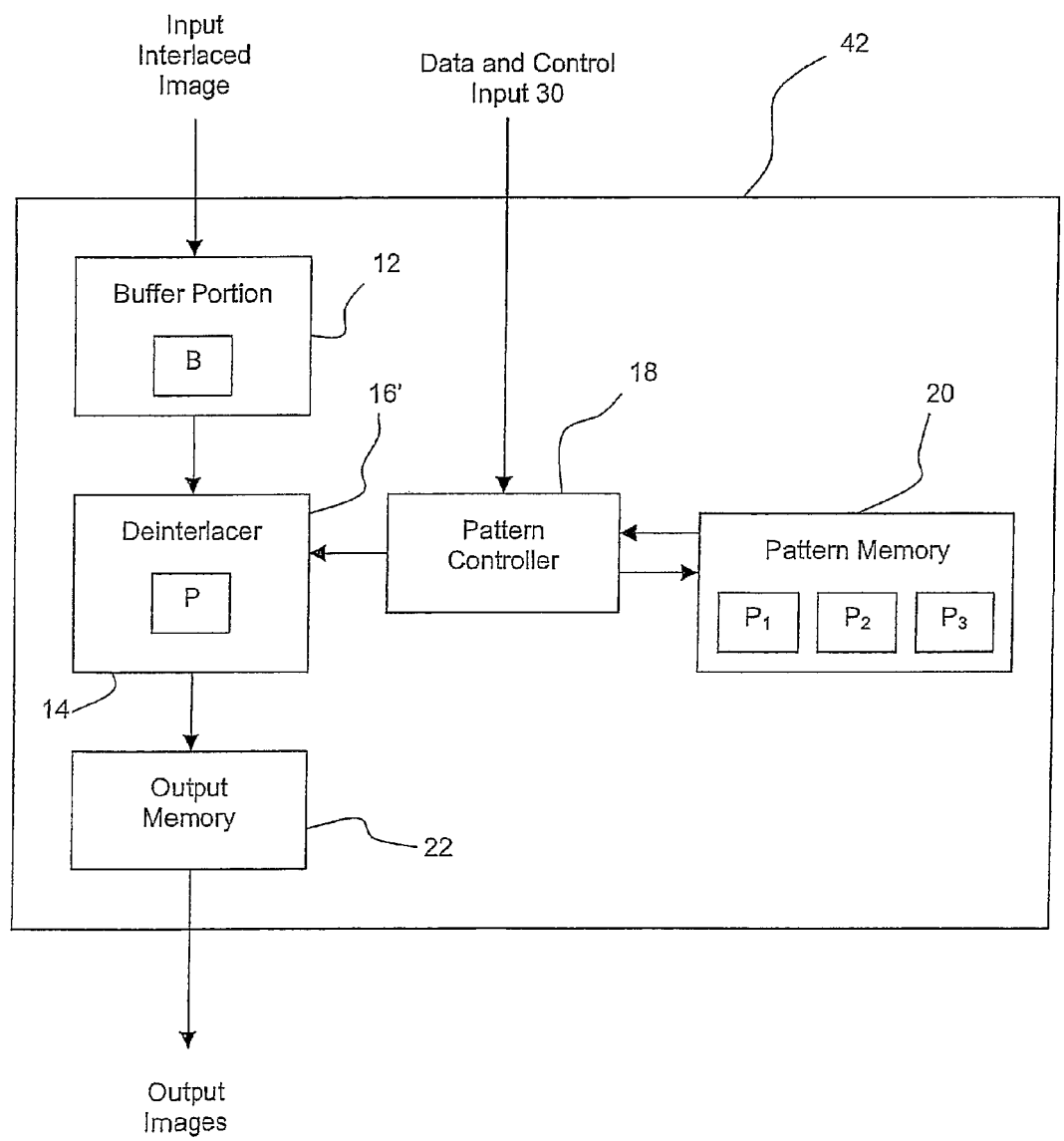
FIG. 16 is a block diagram illustrating a deinterlacing apparatus according to a seventh embodiment of the present invention.

FIG. 16 is a block diagram showing a deinterlacing apparatus 42 according to a seventh embodiment of the present invention. The seventh embodiment is closely based on the second embodiment described above, but with the buffer portion 12 needing only a single buffer area B for buffering input interlaced image data, and the interlacer 16 of the second embodiment being replaced by a deinterlacer 16' in the seventh embodiment. In the seventh embodiment, the patterns stored in the pattern memory 20 and the pattern used by the deinterlacer 16' are deinterlacing configuration patterns which are represented by an instruction set corresponding closely to the instruction set of the interlacing configuration patterns described above. Deinterlacing is performed by traversing the input interlaced image and copying image subpixels to the relevant subpixels in the output deinterlaced images as specified by the deinterlacing pattern P being used by the deinterlacer 16'. A further description of the deinterlacing apparatus 42 is not required in the light of the corresponding embodiments and variations described elsewhere relating to interlacing apparatus. For example, the deinterlacing apparatus could equally traverse the output deinterlaced images and copy relevant subpixels from the input interlaced image to the output deinterlaced images as specified by the deinterlacing pattern.

Figure 17:
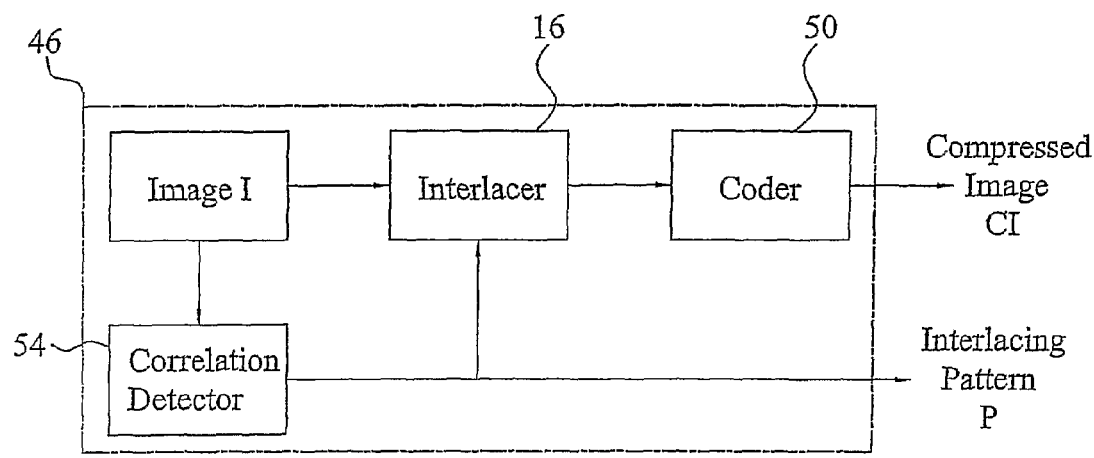
FIG. 17 is a block diagram illustrating an image compressor and an image decompressor according to an eighth embodiment of the present invention.
Figure 17:
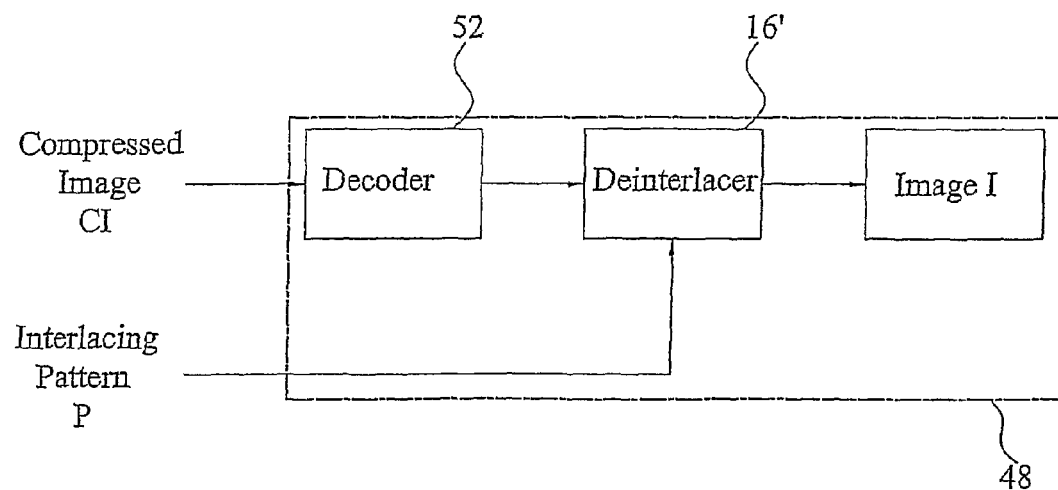

The subpixel interlacing and deinterlacing techniques described above can be used as part of a system to compress and decompress images. FIG. 17 shows such a system 44 according to an eighth embodiment of the present invention, comprising an image compressor 46 communicating information to an image decompressor 48. The image compressor 46 comprises a correlation detector 54, a data compressor or coder 50, and an interlacer 16 corresponding to that in the first to sixth embodiments; an image I is loaded into the image compressor 46.

The correlation detector 54 is arranged to analyse the image I and detect correlation in the image I to establish and decide therefrom which interlacing pattern P will lead to the most efficient compression performance by the coder 50. If the image I is highly correlated, then reordering of the pixel data therein can be used to group the image data together so that it is easier to compress. For example, run length coding and variable length coding can easily compress data that is similar. The best interlacing pattern is chosen by the correlation detector 54 and loaded into the interlacer 16 which rearranges the pixel data in accordance with the interlacing pattern to generate an interlaced image which is then compressed by the coder 50 to produce a compressed image CI having a representation that is more compact than the original representation. The interlacing pattern used is stored with the compressed image CI or sent with it, for receipt at the image decompressor 48. Inverse coding is performed by the decoder 52 and the interlacing pattern P received at the image decompressor 48 is loaded into the deinterlacer 16' to deinterlace the image data so as to restore the original image I.

Although each of the above-described embodiments includes a buffer portion arranged between the input/s for receiving input images and the interlacer 16 or deinterlacer 16', it will be appreciated that a buffer is not required in all implementations. In each of the above-described embodiments a memory 20 is shown and described as being provided in addition to a pattern store within the interlacer 16 or deinterlacer 16' (the latter acting as a local buffer); it will be appreciated that separate such storage areas are not required, it being only necessary to have at least one programmable memory for storing one or more interlacing configuration patterns.

Figure 18:
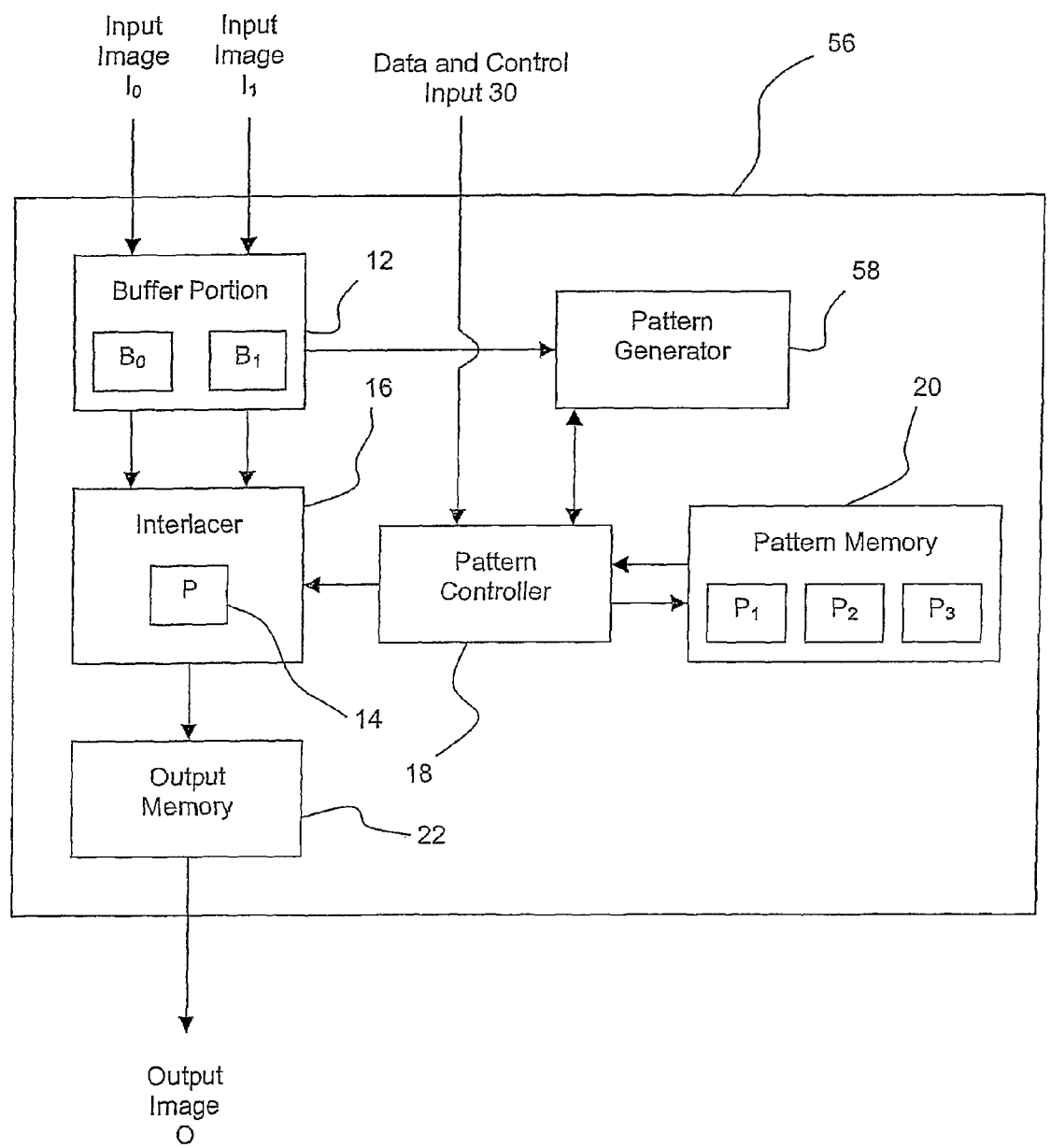
FIG. 18 is a block diagram illustrating an interlacing apparatus according to a ninth embodiment of the present invention.

FIG. 18 is a block diagram illustrating an interlacing apparatus 56 according to a ninth embodiment of the present invention. The ninth embodiment differs from the second embodiment by including a pattern generator 58 arranged in communication with the buffer portion 12 and the pattern controller 18. The pattern generator 58 in the ninth embodiment allows the generation of interlacing configuration patterns in real time, for example based upon the content of the input images, with the result that the number of interlacing configuration patterns is infinite. Such a pattern generator 58 can also be used in conjunction with the image processing capabilities provided in the sixth embodiment above.

In any of the above-described embodiments, the image inputs can be in the form of analogue or digital, in serial or parallel from a digital computer or video source. The inputs can be any combination of standards such as VGA, DVI, IEEE1394, CVBS and so on. The processing functions can be provided by a processing unit such as a Field Programmable Gate Array (FPGA), Complex Programmable Logic Device or microprocessor. An Application Specific Integrated Circuit (ASIC) could be used in the above architecture as a replacement for the processor, with the ASIC reading the interlacing configuration pattern from memory.

For practical implementation where the overall size of the interlacing apparatus is an issue, the amount of memory used by the apparatus could be restricted to a practical range for the type of device (for example display device) being driven by the interlacing apparatus. For example, where the interlacing apparatus is used in conjunction with a display measuring 640 pixels horizontally, it would be sufficient to provide enough memory for storing a maximum of 640 pixels (or 640 pixels for each line for multi-line configuration patterns. Thus the amount of memory can be minimised in dependence on the display type and configuration pattern.

In several of the above embodiments, the memory for storing interlacing configuration patterns is described as being re-programmable during operation of the apparatus. However, it may also be desirable to provide apparatus in which a predefined set of interlacing configuration patterns is stored in the apparatus at the time of manufacture, for example, without the flexibility of loading or generating further interlacing configuration patterns during use. Therefore the appended claims are also to be interpreted as covering such a general-purpose board that is programmable but not reprogrammable; such a board could be manufactured for general use and then configured when it is assembled in a display.

The invention claimed is:

1. An apparatus for interlacing a plurality of input images to form an output image, comprising a programmable memory for storing an interlacing configuration pattern (P) defining a mapping from pixels of the input images to pixels of the output image, and a pixel data rearranger for rearranging pixel data in accordance with the pattern (P) stored in the memory, the pattern (P) comprising at least one instruction defining a source or destination image and the position of a source image pixel relative to a destination image pixel.

2. An apparatus for deinterlacing an input image to form a plurality of output images, comprising a programmable memory for storing a deinterlacing configuration pattern (P) defining a mapping from pixels of the input image to pixels of the output images, and a pixel data rearranger for rearranging pixel data in accordance with the pattern (P) stored in the memory, the pattern (P) comprising at least one instruction defining a source or destination image and the position of a source image pixel relative to a destination image pixel.

3. An apparatus as claimed in claim 1, in which the or each input image comprises a sequence of input images and the or each output image comprises a sequence of output images.

4. An apparatus as claimed in claim 1, in which the pixels are colour component pixels.

5. An apparatus as claimed in claim 1, in which the memory is programmed with the pattern (P) during manufacture of the apparatus and is non-reprogrammable.

6. An apparatus as claimed in claim 1, in which the memory is arranged to contain a plurality of patterns and the apparatus comprises a controller for selecting any one of the patterns for use.

7. An apparatus as claimed in claim 6, in which the controller is responsive to an input signal for selecting and reselecting any one of the patterns during operation of the apparatus.

8. An apparatus as claimed in claim 1, in which the memory is reprogrammable for loading or changing the pattern (P) during operation of the apparatus.

9. An apparatus as claimed in claim 1, in which the memory is arranged to be programmed or reprogrammed with the pattern (P) or a fresh pattern by data received with the input image or any of the input images.

10. An apparatus as claimed in claim 2 in which the memory is arranged to be programmed with the deinterlacing pattern (P) which is derived from an interlacing pattern supplied with the input image or any of the input images.

11. An apparatus as claimed in claim 1, in which the pattern (P) defines a mapping of a proper subset of input image pixels to a proper subset of output image pixels and the rearranger is arranged to repeat the pattern (P) for a plurality of the proper subsets.

12. An apparatus as claimed in claim 11, in which the rearranger is arranged to repeat the pattern (P) so that the plurality of subsets substantially tiles at least one of the input and output images.

13. An apparatus as claimed in claim 12, in which the plurality of subsets substantially tiles the or each output image.

14. An apparatus as claimed in claim 4, in which the at least one instruction defines a colour component and the position represents the position of a group of source colour component pixels forming a source composite colour group relative to a group of destination colour component pixels forming a destination composite colour group.

15. An apparatus as claimed in claim 1, in which the rearranger is arranged to generate each output image pixel in turn.

16. An apparatus as claimed in claim 1, comprising an input buffer for the or each input image or sequence of input images.

17. An apparatus as claimed in claim 1, comprising an output buffer for the or each output image or sequence of output images.

18. An apparatus as claimed in claim 1, in which the or each output image is built up from a plurality of input images received in sequence.

19. An apparatus as claimed in claim 1, comprising a pixel data processor for processing each pixel data during rearrangement by the rearranger.

20. An apparatus as claimed in claim 1, in which input image data are tagged to indicate to which input image the data relate.

21. A display comprising an apparatus as claimed in claim 1 and a display device.

22. A display as claimed in claim 21, in which the display device is a multiple view directional display device and the rearranger is controlled by the pattern for spatially multiplexing the input images or sequences of input images.

23. A display as claimed in claim 22, in which the display device comprises a spatial light modulator and a parallax optic.

24. An image compressor comprising a correlation detector for detecting correlation in an input image (I) and establishing therefrom an interlacing configuration pattern (P) defining a mapping from pixels of the input image (I) to pixels of an interlaced image, a pixel data rearranger for rearranging pixel data in accordance with the pattern (P) so as to generate the interlaced image, and a data compressor for compressing the interlaced image.

25. An image decompressor comprising a data decompressor for decompressing a compressed interlaced image (CI) from an image compressor as claimed in claim 24, and a. further pixel data rearranger for rearranging the pixel data of the decompressed interlaced image in accordance with a deinterlacing configuration pattern which is the inverse of the interlacing configuration pattern (P) to provide an output image (I).

* * * * *